United States Patent [19]
Rodier et al.

[11] 3,748,024
[45] July 24, 1973

[54] MOUNTING FOR A ZOOM LENS

[75] Inventors: Christian Rodier, Creteil; Paul Carre, Dijon, both of France

[73] Assignee: Societe de'Optique Precision, Electronique et Mecanique, Paris, France

[22] Filed: Aug. 19, 1971

[21] Appl. No.: 172,971

[30] Foreign Application Priority Data
  Sept. 7, 1970  France .............................. 7032693

[52] U.S. Cl. .................... 350/255, 350/46, 350/184
[51] Int. Cl. .............................................. G02b 7/02
[58] Field of Search .................... 350/184, 255, 245, 350/46, 47

[56] References Cited
UNITED STATES PATENTS
2,443,390  6/1948  Kingston ............................. 350/178
2,566,485  9/1951  Cuvillier ............................. 350/184
3,163,701  12/1964  Staubach ........................... 350/255
3,399,015  8/1968  Jacobs ................................ 350/255
2,970,516  2/1961  Back et al. ......................... 350/184

FOREIGN PATENTS OR APPLICATIONS
1,058,001  2/1967  Great Britain ..................... 350/255

Primary Examiner—David Schonberg
Assistant Examiner—Michael J. Tokar
Attorney—William B. Kerkam, Jr.

[57]  ABSTRACT

Mounting for a zoom lens having a fixed tube and an inner movable member, in which the fixed tube is provided with internal segments which hold a fixed lens, and the movable member is formed of longitudinal elements which extend between one on each side of the segments and terminate in opposed annular portions which locate the movable lenses.

3 Claims, 2 Drawing Figures

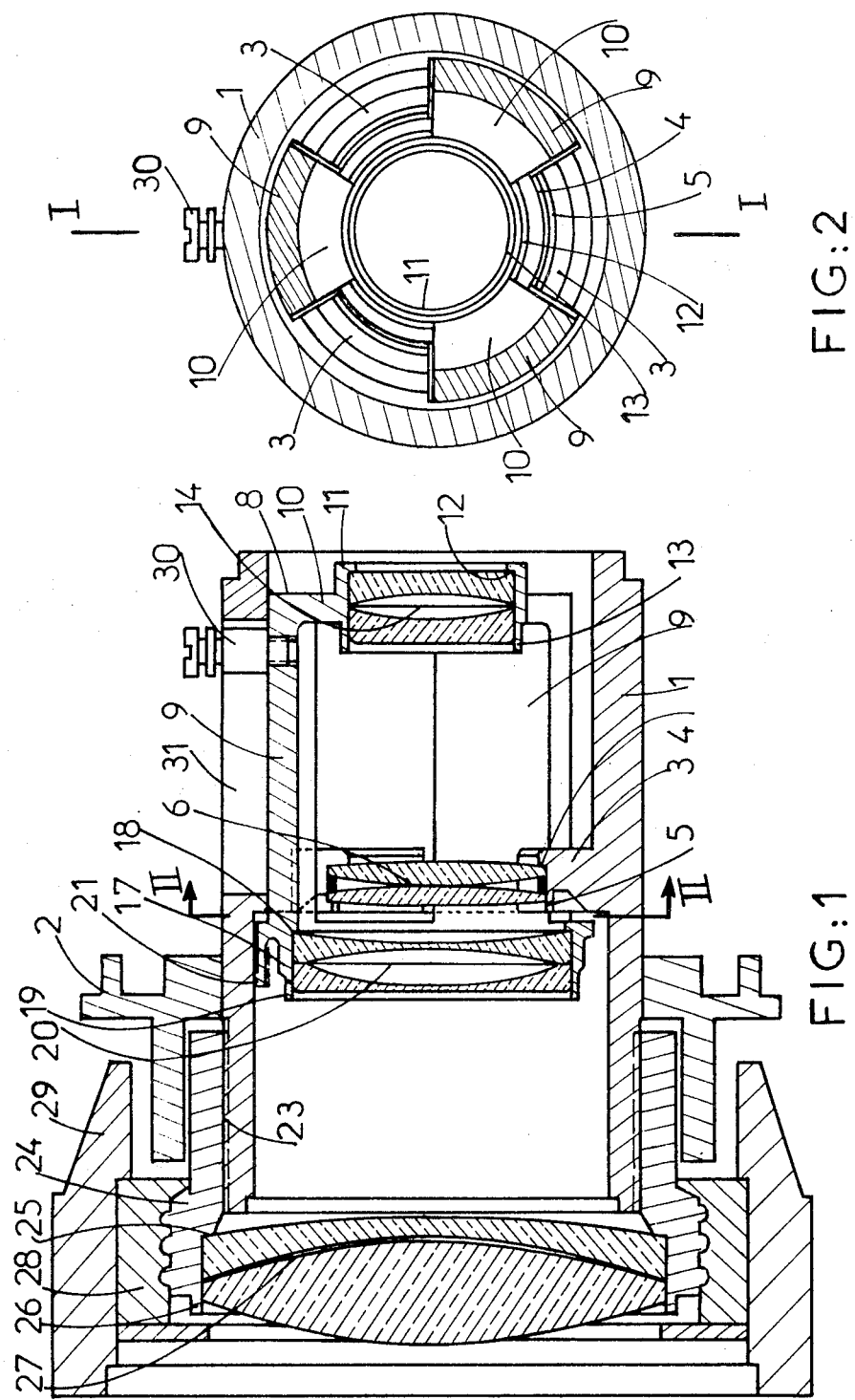

MOUNTING FOR A ZOOM LENS

This invention relates to a mounting for a zoom lens of the optical compensation type.

The known optical system of a zoom lens of this type comprises a fixed lens and two movable lenses situated on either side of the fixed lens and moving in conjunction in relation to the fixed lens. The zoom lens is completed by a front focusing lens which is adjustable independently in relation to the fixed lens. The zoom lens also usually has at the rear a complementary optical system to form a final image on a film or any sensitive surface. Of course the term "lens" is used in this context and in the remainder of the description to denote either a single lens or lens element or a group of lenses or lens elements permanently fixed together.

The mechanical construction of the mounting of such a zoom lens is complex because it requires a movable system extending through the support for the central fixed lens. Known mountings for zoom lenses of this type therefore generally comprise a fixed tube and an internal movable tube which acts as a piston and has longitudinal notches. To assemble the zoom lens, a star-shaped support is introduced into the movable tube and its arms pass into the notches and the actual mounting of the fixed lens is screwed into the centre of said support. The assembly is then introduced into the fixed tube and the star-shaped support is locked by fixing its arms to the fixed tube by screws. The mountings of the two movable lenses can then be screwed to the two ends of the movable tube. The assembly is finally completed by the front lens, which is generally mounted on a bush screwed on the fixed tube for the focusing adjustment.

Such an assembly therefore comprises a large number of mechanical precision parts, resulting in a very high cost price due both to the complexity of the component parts and the multiplicity of operations for final assembly.

The invention obviates these disadvantages and provides economic production of a zoom lens of the optical compensation type with a front focusing lens, economy being achieved by forming the mounting from just three cheap main parts which are very easy to assemble.

According to one aspect, the invention relates to a zoom lens having two lens members movable on either side of a fixed lens member, said two lenses moving in conjunction, and a movable focusing lens member which is adjustable independently in relation to the fixed lens member, each of said lens members comprising at least one lens or lens element, wherein the mounting comprises a fixed tube having at least two angularly equidistant internal projecting segments which are integral with the tube and which are limited internally to a bore of a diameter corresponding to that of the fixed lens member, and on which said fixed lens member is mounted, an integral movable member sliding inside the fixed tube and consisting of longitudinal elements of the same number as the internal projecting segments on the fixed tube and of angular section complementary to the segments, said longitudinal elements being connected at one of their ends by extensions situated in the same angular segment, to a coaxial cylindrical annular part of an outside diameter less than the diameter of the fixed lens member and inside which one of the movable lens members is fixed, and at their other end to another coaxial cylindrical annular part inside which the other movable lens member is mounted, a bush bearing the movable focusing lens member and being adjustable in position by screwing on the fixed tube.

The invention will now be described in greater detail with reference to a specific embodiment, given by way of example only and illustrated in the accompanying drawings, in which:

FIG. 1 is a longitudinal axial section on the line I — I in FIG. 2 of a cine camera lens using a mounting constructed according to the invention; and FIG. 2 is a cross-section on the line II—II in FIG. 1.

Referring to FIGS. 1 and 2, the zoom lens comprises a fixed tube 1 of integrally moulded plastic fitted into an element 2 of the casing of the camera. The tube comprises three internal projecting segments 3 bounded by a cylindrical surface coaxial with the optical axis of the zoom lens. On each segment, this cylindrical surface is bounded rearwardly by a shoulder 4 and towards the front the segment has a thin annular collar 5. These segments serve as a support for the fixed central lens 6, which in this case consists of two convex lens elements. The member 8, which is slidable in the tube 1, comprises three longitudinal annular segments 9 disposed in the complementary recesses of the projecting segments 3. The three longitudinal elements 9 are connected at the rear, by extensions 10 disposed in the same angular segment, to a cylindrical portion 11, the outside diameter of which is less than the inside diameter of the segments 3. The cylindrical part 11 has an annular shoulder 12 at the rear and a thin annular collar 13 at the front. The cylindrical element 11 receives the rear movable lens 14.

At the front, the longitudinal elements 9 are connected by a cylindrical portion 17 comprising an annular shoulder 18 and a thin annular collar 19. The cylindrical part 17 receives the front movable lens 20. The cylindrical part 17 comprises three flexible tongues 21.

The movable member 8 comprising the longitudinal elements 9 and the cylindrical parts 11 and 17 is an integral member moulded from plastics.

At the front, the fixed tube 1 has a screwthread 23 over which engages a screwthreaded bush 24 comprising a shoulder 25 and a thin annular collar 26, and which receives the front lens 27. The bush 24 is a plastic moulding.

The bush 24 receives a collar 28 on which the reference bush 29 is fixed. The overhang of the bush 29 is used for locating the position of the front lens 27 with respect to the casing 2, i.e., with respect to the fixed lens 6, thus indicating the focusing of the complete zoom lens.

It will be seen that the mounting thus described comprises only three parts apart from the lenses, viz., the fixed tube 1, the sliding carriage 8, and the focusing bush 24. Before the front lens is fitted, the relative dimensions of the cylindrical part 11 and of the segments 3 enable the carriage 8 to be engaged inside the tube 1, the elements 9 passing into the recesses left free by the segments 3 and the cylindrical part 11 passing inside the segments 3.

The complete zoom lens is therefore assembled by first fitting the lens 14 into the cylindrical part 11. This operation can be carried with the part 8 separate. The lens 14 is brought to bear against the shoulder 12 and then held in position by folding over the collar 13 by hot crimping of the plastic material. The sliding carriage 8 can then be fitted into the tube 1 by introducing it from the front, the assembly comprising the support 11 and the lens 14 passing inside the segments 3. The lens 6 is then fitted on the segments 3 by bringing it to bear against the shoulders 4 and folding over the collars 5 by hot crimping. The lens 20 can then similarly be fitted against the shoulders 17 by hot crimping of the collars 19. The movable carriage 8 is then retained in the tube 1. The resilience of the tongues 21 bearing on the inside diameter of the tube 1 allows the sliding clearances to be taken up.

The front lens 27 is fitted on the bush 24 by bringing it to bear on the shoulder 25 and by hot crimping the collar 26. The bush 24 is then simply screwed on the tube 1 to complete assembly of the zoom lens.

The sliding movement of the carriage 8 in the tube 1 to vary the focal length of the zoom lens is produced by means of the control stud 30 screwed into one of the carriage elements 9 and passing through an oblong slot 31 formed in the body of the tube 1.

Of course the invention is not strictly limited just to the embodiment described by way of example but also covers other embodiments differing therefrom only in detail.

For example, there need not necessarily be three internal projecting segments on the fixed tube and three corresponding longitudinal elements in the case of the movable carriage; nor is it essential for the segments and the elements of the carriage 8 to have the same angular value. The carriage 8 could conceivably have just two annular guide segments, the fixed tube 1 then having the corresponding projecting segments. Similarly, there could be four or five longitudinal guide lines.

The invention would also apply to a zoom lens comprising two connected movable lenses enclosing another movable lens of the mechanical compensation type.

We claim:

1. A mounting for a zoom lens having two lens members which are movable on either side of a fixed lens member, said two lens members moving in conjunction, and a movable focusing lens member which is adjustable independent in relation to the fixed lens member, each of said lenses comprising at least one lens or lens element, wherein the mounting comprises a single fixed tube having at least two angularly equidistant spaced internal projecting segments which are integral with the tube and which are limited internally to a bore of a diameter corresponding to that of the fixed lens member, and on which the said fixed lens member is mounted, an integral single movable member sliding inside the fixed tube and having integral longitudinal elements of the same number as the internal projecting segments on the fixed tube and of angular section complementary to the space between the segments, said elements being integrally connected at one end by extensions of the same angular shape of the element, to a first coaxial cylindrical annular part of an outside diameter less than the diameter of the fixed lens member, and inside which one of the movable lens members is mounted, and the elements being integrally connected at their other end to a second coaxial cylindrical annular part of an outside diameter greater than that of the fixed lens member inside which second part the other movable lens member is mounted, a bush mounting the movable focusing lens member and being focused by screw adjustment on the fixed tube.

2. A mounting for a zoom lens according to claim 1, wherein one of the longitudinal elements of the movable member includes an external operating stud engaged in a corresponding longitudinal aperture in the fixed tube.

3. A mounting for a zoom lens according to claim 2, wherein each of the constituent parts of the mounting are integrally moulded plastic and each cylindrical recess to mount a lens member having an internal annular shoulder on one end and an annular collar on the other end, said annular collar projecting beyond and engaging over the lens member.

* * * * *